US012646665B2

(12) United States Patent
Kakimoto et al.

(10) Patent No.: US 12,646,665 B2
(45) Date of Patent: Jun. 2, 2026

(54) PUSH BUTTON SWITCH

(71) Applicant: OMRON Corporation, Kyoto (JP)

(72) Inventors: Naoya Kakimoto, Kyoto (JP); Shun Kato, Kyoto (JP); Hajime Kawai, Kyoto (JP); Masaki Sugihara, Kyoto (JP)

(73) Assignee: OMRON Corporation, Kyoto (JP)

( * ) Notice: Subject to any disclaimer, the term of this patent is extended or adjusted under 35 U.S.C. 154(b) by 495 days.

(21) Appl. No.: 18/280,956

(22) PCT Filed: Mar. 17, 2022

(86) PCT No.: PCT/JP2022/012135
§ 371 (c)(1),
(2) Date: Feb. 19, 2024

(87) PCT Pub. No.: WO2022/215474
PCT Pub. Date: Oct. 13, 2022

(65) Prior Publication Data

US 2025/0029796 A1 Jan. 23, 2025

(30) Foreign Application Priority Data

Apr. 9, 2021 (JP) ................................ 2021-066764

(51) Int. Cl.
*H01H 13/02* (2006.01)
*H01H 13/14* (2006.01)

(52) U.S. Cl.
CPC .......... *H01H 13/023* (2013.01); *H01H 13/14* (2013.01)

(58) Field of Classification Search
CPC ................ H01H 13/023; H01H 13/14; H01H 2239/022; H01H 13/02; H03K 2217/94108; H03K 17/941
See application file for complete search history.

(56) References Cited

U.S. PATENT DOCUMENTS 6,234,651 B1 * 5/2001 Kodama .................. H01H 9/18 362/802
2008/0060918 A1 * 3/2008 Chiang ................ H03K 17/941 200/61.02

FOREIGN PATENT DOCUMENTS

JP 2000057873 2/2000
JP 2003072486 3/2003
(Continued)

OTHER PUBLICATIONS

"International Search Report (Form PCT/ISA/210) of PCT/JP2022/012135", mailed on May 24, 2022, with English translation thereof, pp. 1-4.

(Continued)

*Primary Examiner* — Lheiren Mae A Caroc
(74) *Attorney, Agent, or Firm* — JCIPRNET

(57) ABSTRACT

A push button switch includes a push button, a movable contact that moves together with the push button, and a fixed contact with respect to which the movable contact comes into contact or separates in accordance with the operation of the movable contact. The push button switch includes a light emitting element, and a light receiving element. A light emitting position where light emitted from the light emitting element is radiated to the outside, and a light receiving position where light detected by the light receiving element is received from the outside are disposed outward of an edge of the push button when viewed in a pushing direction. The light receiving element is disposed to detect light emitted from the light emitting element and reflected by an object in a detection region set in a space on the push button side in the opposite direction to the pushing direction.

18 Claims, 14 Drawing Sheets

(56) References Cited

FOREIGN PATENT DOCUMENTS

| | | |
|---|---|---|
| JP | 2013164968 | 8/2013 |
| JP | 2016004767 | 1/2016 |

OTHER PUBLICATIONS

"Written Opinion of the International Searching Authority (Form PCT/ISA/237) of PCT/JP2022/012135", mailed on May 24, 2022, with English translation thereof, pp. 1-8.
"Office Action of Japan Counterpart Application", issued on Sep. 3, 2024, with English translation thereof, pp. 1-6.

* cited by examiner

PUSH BUTTON SWITCH

CROSS-REFERENCE TO RELATED APPLICATION

This application is a 371 application of the International PCT application serial no. PCT/JP2022/012135, filed on Mar. 17, 2022, which claims the priority benefits of Japan Patent Application No. 2021-066764, filed on Apr. 9, 2021. The entirety of each of the above-mentioned patent applications is hereby incorporated by reference herein and made a part of this specification.

TECHNICAL FIELD

The disclosure relates to a push button switch.

RELATED ART

Push button switches are used in various machines such as elevators. For example, the applicant of this application has proposed a push button switch that may be applied for operating an elevator in Patent Literature 1. The push button switch described in Patent Literature 1 allows an operator to operate the elevator by directly pushing it.

CITATION LIST

Patent Literature

[Patent Literature 1] Japanese Patent Laid-Open No. 2016-4767

SUMMARY

Technical Problem

However, recently, there is a growing demand for push button switches that may be operated non-contactly for the purpose of improving convenience and ensuring public health. Nevertheless, as described in Patent Literature 1, there is still a high demand for push button switches that operate by direct pushing.

The disclosure provides a push button switch that may be operated not only by push operation but also non-contactly.

Solution to Problem

To solve the above problem, a push button switch described in this application includes a push button that may be pushed in; a movable contact that moves together with the push button; and a fixed contact with respect which the movable contact comes into contact or separates in accordance with the operation of the movable contact. The push button switch further includes a light emitting element and a light receiving element. A light emitting position at which light emitted from the light emitting element is radiated to the outside, and a light receiving position at which light detected by the light receiving element is received from the outside are disposed outward of an edge of the push button in a line of sight viewed in a pushing direction. The light receiving element is disposed in such a way as to detect light that has been emitted from the light emitting element and has been reflected by an object in a detection region set in a space on the side of the push button in the opposite direction to the pushing direction.

Furthermore, in the push button switch, from a viewpoint of viewing the pushing direction, a midpoint of a line segment connecting the light emitting position and the light receiving position is positioned on the push button.

Moreover, in the push button switch, from a viewpoint of viewing the pushing direction, a shape of an outer edge of the push button is rotationally symmetric, and the midpoint of the line segment connecting the light emitting position and the light receiving position substantially coincides a center of symmetry of rotational symmetry.

Furthermore, the push button switch includes: a light emitting optical path through which light emitted from the light emitting element passes; a light emitting lens disposed at the light emitting position and refracting light passing through the light emitting optical path; a light receiving optical path through which light detected by the light receiving element passes; and a light receiving lens disposed at the light receiving position and refracting light from outside to pass through the light receiving optical path.

Furthermore, in the push button switch, at least one of the light emitting lens and the light receiving lens has a refractive surface that refracts light formed on wither an exiting side or an entering side.

Furthermore, in the push button switch, at least one of the light emitting lens and the light receiving lens has a refractive surface on both the exiting side and the entering side for refracting light.

Furthermore, in the push button switch, at least one of the light emitting optical path and the light receiving optical path has a tubular shape with a protruding part protruding inward.

Furthermore, the push button switch includes a device for causing the light emitting element to emit light in a predetermined light emitting pattern; a device for comparing a light receiving pattern detected by the light receiving element with the light emitting pattern; and a device for determining, in a case where the light receiving pattern matches the light emitting pattern, that reflected light of light emitted from the light emitting element has been detected.

The push button switch described in this application includes a push button that may be pushed in, a light emitting element that emits light, and a light receiving element that detects reflected light emitted from the light emitting element. This allows the push button switch described in this application to be operated not only by push operation but also non-contact operation.

Effects

The push button switch according to this disclosure includes a push button that may be pushed in, a light emitting element, and a light receiving element. The light receiving element detects light emitted from the light emitting element and reflected by an object in a detection region. Accordingly, the push button switch according to the disclosure not only enables push operation, but also enables non-contact operation by detecting reflected light from an object in the detection region, thereby achieving excellent effects.

DESCRIPTION OF THE EMBODIMENTS

Below, embodiments of the disclosure will be described with reference to drawings.

Application Example

Figure 1:
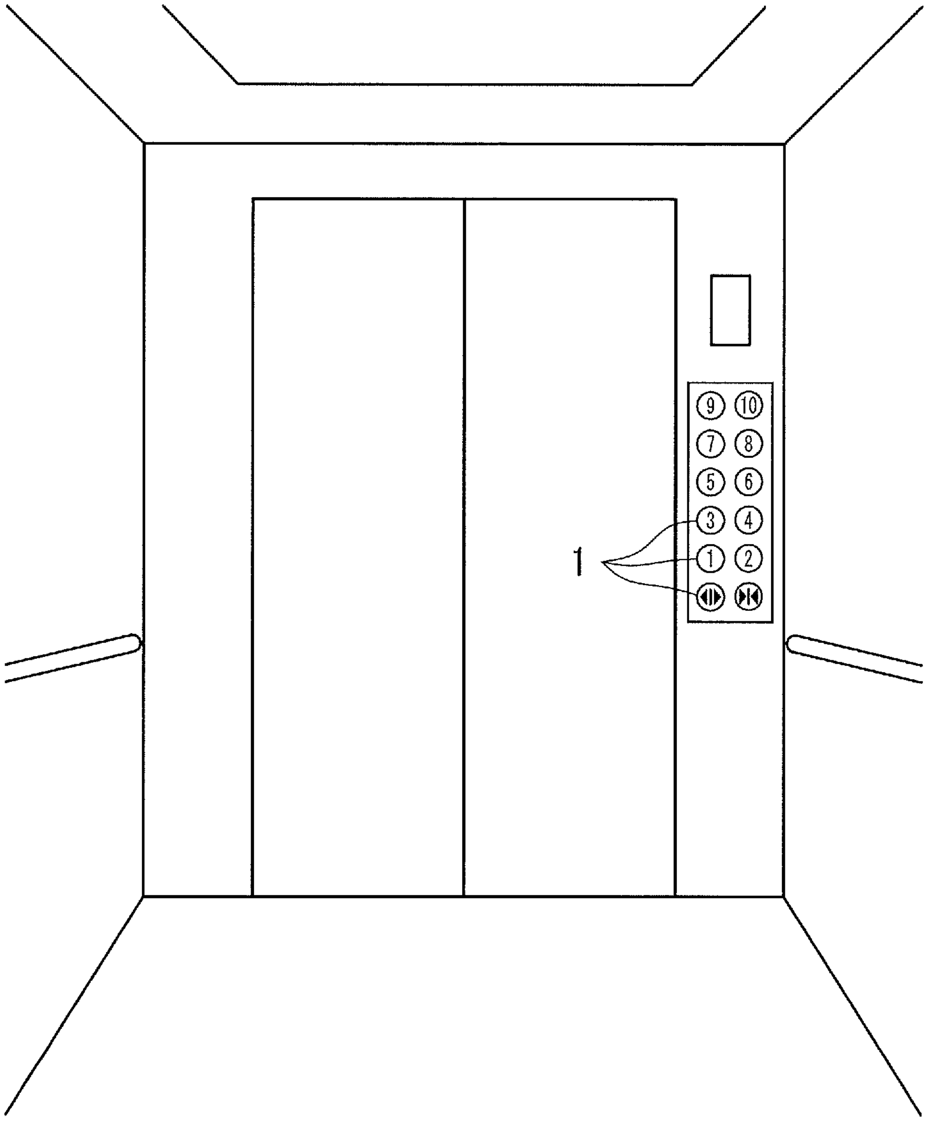
FIG. 1 is a schematic diagram illustrating an example of an elevator to which the push button switch described in this application is applied.

The push button switch described in this application may be used, for example, as an operation switch for an elevator. Hereinafter, a description will be given of a push button switch 1 exemplified in drawings with reference to drawings. FIG. 1 is a schematic diagram illustrating an example of an elevator where the push button switch 1 described in this application is applied. FIG. 1 illustrates multiple push button switches 1 disposed on a control panel inside a cage that ascends and descends as an elevator. The push button switch 1 described in this application may be applied to various types of push button switches 1, such as a push button switch 1 on which numbers indicating destination floors are noted, and a push button switch 1 on which symbols used for door opening and closing operations are noted. Moreover, the push button switch 1 described in this application is not only applicable to the push button switch 1 disposed on the control panel inside the elevator cage, but is also applicable to various push button switches 1 such as a push button switch 1 on the control panel at the elevator's ascent and descent locations, which is used to call the cage.

<Example Configuration of Push Button Switch 1>

Figure 2:
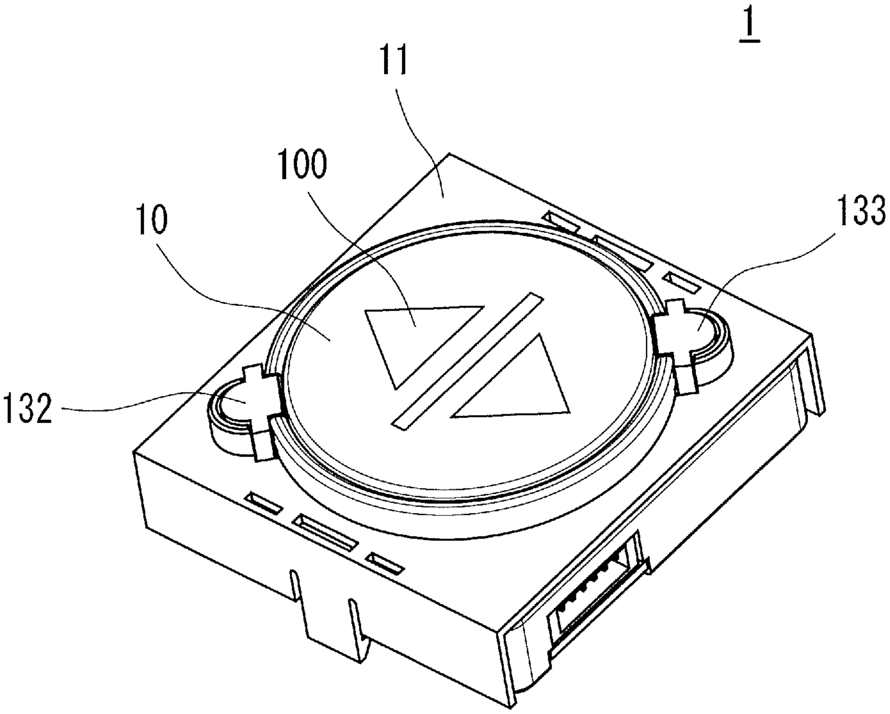
FIG. 2 is a schematic perspective diagram illustrating an example of an appearance of the push button switch described in this application.

FIG. 2 is a schematic perspective diagram illustrating an example of the appearance of a push button switch 1 described in this application. The push button switch 1 includes a push button 10 and a housing 11 in which the push button 10 is disposed. In this application, the direction in which the push button 10 is disposed with respect to the housing 11 is referred to as the front, and the direction in which the push button 10 is pushed is referred to as the rear, but these are directions for convenience of explanation and do not limit the arrangement direction of the push button switch 1 described in this application. The push button 10 has a substantially disk-like shape. The push button switch 1 illustrated in FIG. 2 is a switch used for door opening and closing operations, and a notation part 100 that imitates the shape of an open door symbol or the like indicating that the door is opened is formed approximately at the center. The notation part 100 is formed using a material such as a semi-transparent resin, for example, and transmits visible light emitted from an illumination part (not illustrated) provided inside the push button switch 1. Behind the push button 10, a mechanical contact mechanism 12 to be described later is disposed, and behind the periphery of the push button 10, a non-contact contact mechanism 13 to be described later is disposed. The mechanical contact mechanism 12 and the non-contact contact mechanism 13 serve as contact mechanisms that open and close the circuit of the push button switch 1.

Outward of the edge of the push button 10 from a line of sight viewed in the pushing direction, there are disposed a light emitting lens 132 that refracts light emitted from a light emitting element 130 (see FIG. 4 etc.) to be described later, and a light receiving lens 133 that refracts light detected by a light receiving element 131 (see FIG. 4 etc.) to be described later. Since the light emitting lens 132 and the light receiving lens 133 are disposed outward of the edge of the push button 10, it is possible to prevent adhesion of adhering substances such as grease of fingertip because fingertips do not touch them when an operator performs a push operation on the push button 10.

The light emitting lens 132 is disposed at a light emitting position at which light emitted from the light emitting element 130 is radiated to the outside, and the light receiving lens 133 is disposed at a light receiving position at which light detected by the light receiving element 131 is received from the outside. From a line of sight viewed in the pushing direction, the shape of an outer edge of the push button 10 is approximately circular with rotational symmetry, and a midpoint of a line segment connecting the light emitting position where the light emitting lens 132 is disposed and the light receiving position where the light receiving lens 133 is disposed substantially coincides with a center of symmetry of rotational symmetry. In a case of pushing the push button 10, the operator pushes the center of the notation part 100 of the push button 10 as a target. The same applies when detecting non-contactly; an operator brings his/her fingertip close to the push button 10 with the center of the notation part 100 as a target. In the push button switch 1 described in this application, by making the midpoint of line segment connecting the light emitting position and the light receiving position coincide with the center of symmetry of rotational symmetry which is the center of the notation part 100, it becomes possible to accurately detect fingertips approaching the notation part 100.

Figure 3:
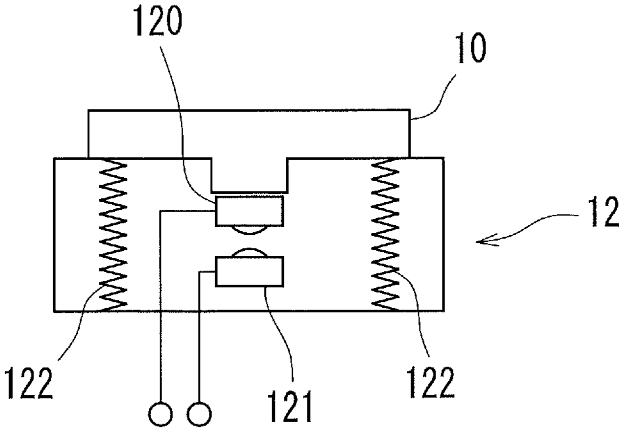
FIG. 3 is a schematic cross-sectional diagram schematically illustrating an example of a mechanical contact mechanism provided in the push button switch described in this application.

FIG. 3 is a schematic cross-sectional diagram illustrating an example of a mechanical contact mechanism 12 provided in the push button switch 1 described in this application. FIG. 3 schematically illustrates the cross section of the mechanical contact mechanism 12, with the upper part of the drawing representing the front of the push button switch 1. The mechanical contact mechanism 12 is a mechanism that outputs a signal by pushing the push button 10, and includes various members such as a movable contact 120, a fixed contact 121, and biasing members 122. The movable contact 120 is attached to the rear of the push button 10 and is a contact that moves together with the push button 10, while the fixed contact 121 is a contact fixed inside the housing 11. The biasing member 122 is a member such as a compression coil spring that biases the push button 10 forward.

Figure 4:
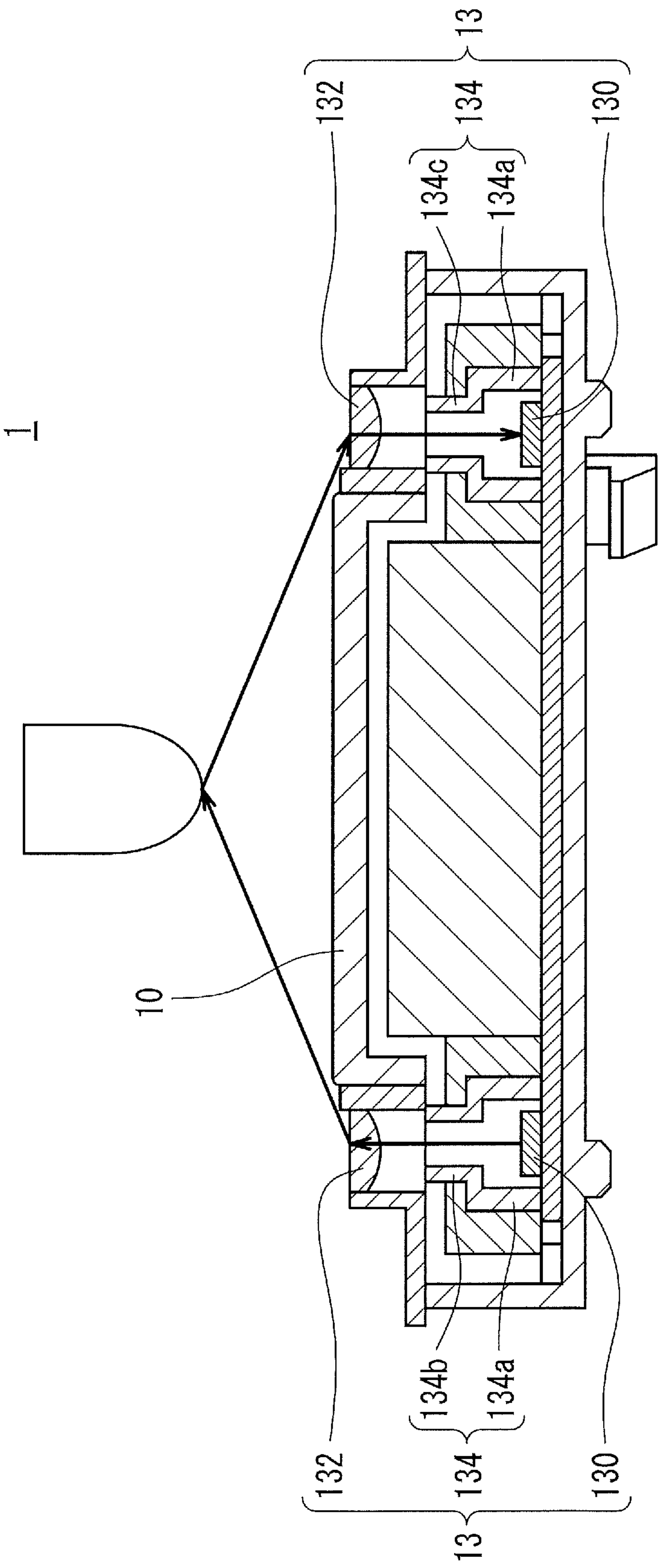
FIG. 4 is a schematic cross-sectional diagram schematically illustrating an example of a non-contact contact mechanism provided in the push button switch described in this application.

FIG. 4 is a schematic cross-sectional diagram illustrating an example of a non-contact contact mechanism 13 provided in the push button switch 1 described in this application. FIG. 4 illustrates the cross section of the non-contact contact mechanism 13 provided in the push button switch 1 described in this application, with the upper part of the drawing representing the front of the push button switch 1. In FIG. 4, to facilitate understanding of the function of the non-contact contact mechanism 13, arrows indicating light emitted from the light emitting element 130 and detected by the light receiving element 131, and objects such as fingertips that reflect light are schematically illustrated. The non-contact contact mechanism 13 includes the light emitting element 130 such as an LED (Light Emitting Diode) that emits light, and the light receiving element 131 such as a PD (Photo Diode), PT (Photo Transistor) that detects light. Furthermore, the non-contact contact mechanism 13 includes various configurations such as the light emitting lens 132 and the light receiving lens 133 previously mentioned, an optical path member 134 as an optical path for light, and a controller 135 (see FIG. 5 etc.) that controls the light emitting element 130 and the light receiving element 131.

The light emitting element 130 and the light receiving element 131 are covered by the optical path member 134 that forms a two-stage, nearly cylindrical shape. The optical path member 134 covering the light emitting element 130 has a shape in which a cylinder with a smaller radius is superimposed on the front of a cylinder with a larger radius. The rear cylinder of the optical path member 134 covering the light emitting element 130 mainly functions as a light shielding part 134*a* that shields light, and the front cylinder of the optical path member 134 forms a light emitting optical path 134*b* that allows light emitted from the light emitting element 130 to pass through. The optical path member 134 covering the light receiving element 131 has a shape in which a cylinder with a smaller radius is superimposed on top of a cylinder with a larger radius. The rear cylinder of the optical path member 134 covering the light receiving element 131 mainly functions as the light shielding part 134*a* that shields light, and the front cylinder of the optical path member 134 forms a light receiving optical path 134*c* that allows light detected by the light receiving element 131 to pass through. The optical path member 134 is disposed within the housing 11 so as to cover the light emitting element 130 and the light receiving element 131. By covering the light emitting element 130 and the light receiving element 131 with the optical path member 134, it limits the exiting direction of the light emitted by the light emitting element 130 and prevents the light receiving element 131 from detecting any other light than desired. Light other than the intended light can be, for example, visible light emitted from an illumination part that is disposed inside the push button switch 1 and that irradiates the notation part 100 of the push button 10.

The light emitting lens 132 is disposed at the front end of the optical path member 134 covering the light emitting element 130. The light emitting lens 132 is composed of optical members such as convex lenses. The light emitting lens 132 receives entering of light emitted from the light emitting element 130 and passed through the light emitting optical path 134*b*, refracts the light entered, and have it exit to the outside. The light receiving lens 133 is disposed at the front end of the optical path member 134 covering the light receiving element 131. The light receiving lens 133 is composed of optical members such as convex lenses. The light receiving lens 133 refracts light entered from outside and have it exit towards the light receiving element 131.

The light emitted from the light emitting element 130 passes through the light emitting optical path 134*b*, is refracted by the light emitting lens 132, and exits to the outside. In a case where an object such as a fingertip exists within the detection region set in front of the push button switch 1, the light exiting to the outside is reflected by the object. The light reflected by the object enters the light receiving lens 133 from outside, is refracted by the light receiving lens 133, passes through the light receiving optical path 134*c*, and is detected by the light receiving element 131.

Figure 5:
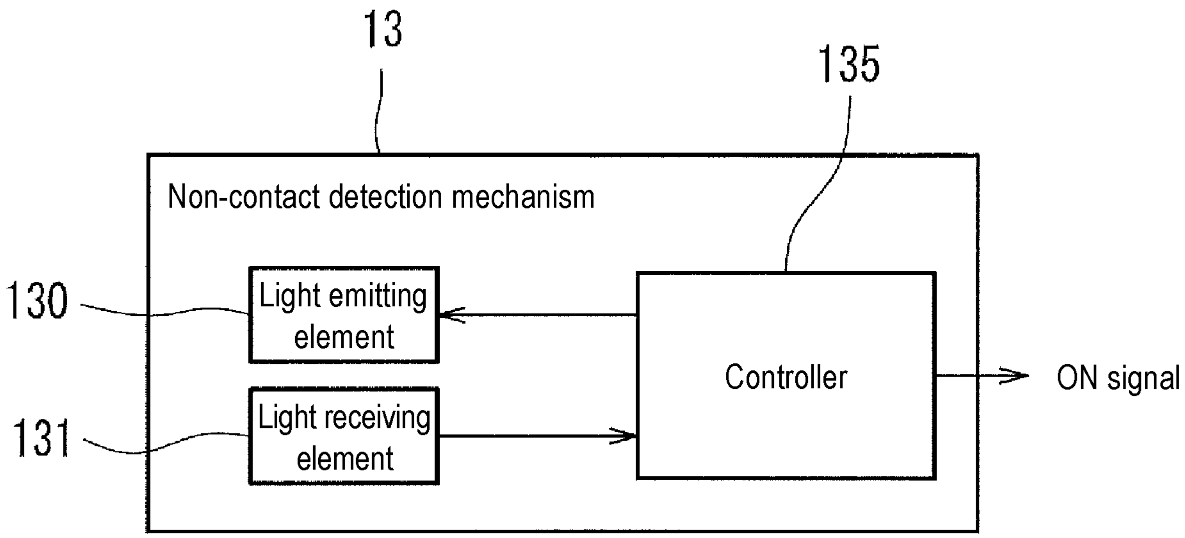
FIG. 5 is a functional block diagram illustrating a schematic of control configuration of a non-contact contact mechanism provided in the push button switch described in this application.

FIG. 5 is a functional block diagram illustrating a schematic of the control configuration of the non-contact contact mechanism 13 provided in the push button switch 1 described in this application. The non-contact contact mechanism 13 of the push button switch 1 includes a controller 135 using integrated circuits such as IC (Integrated Circuit), LSI (Large Scale IC), VLSI (Very Large Scale IC), etc., and controls the entire mechanism including the light emitting element 130 and the light receiving element 131 by the controller 135. The controller 135 outputs a light emitting signal of a light emitting pattern set in advance to the light emitting element 130, causing the light emitting element 130 to emit light in a light emitting pattern based on the light emitting signal. Furthermore, the controller 135 detects the light detection by the light receiving element 131. In a case where the controller 135 determines that the reflected light from the light emitted from the light emitting element 130 has been detected by the light receiving element 131, it outputs an ON signal to the control circuit of the elevator body. Moreover, the controller 135 may be housed inside the housing 11 or may be placed outside the housing 11.

Operation

Figure 6:
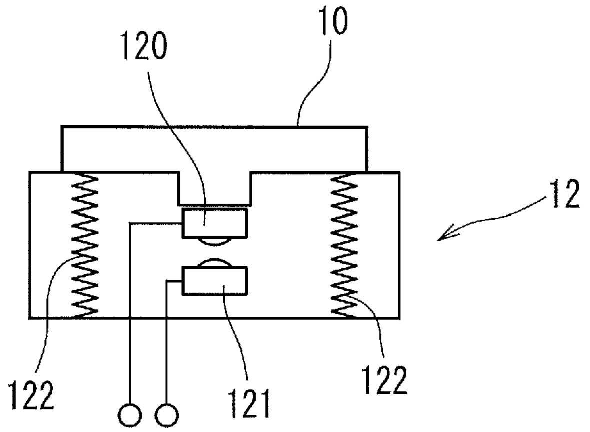
FIG. 6 is a schematic cross-sectional diagram illustrating an example of operation of a mechanical contact mechanism provided in the push button switch described in this application.
Figure 7:
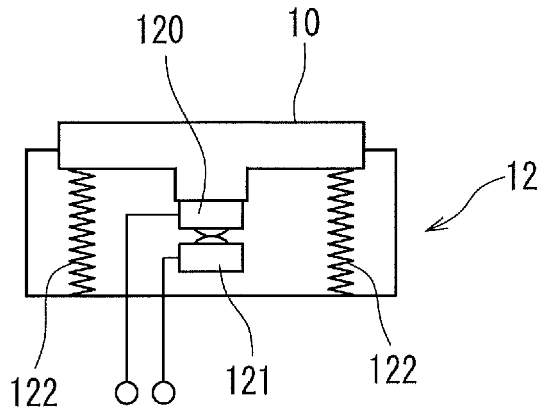
FIG. 7 is a schematic cross-sectional diagram illustrating an example of operation of a mechanical contact mechanism provided in the push button switch described in this application.

Next, the operation of the push button switch 1 described in this application will be explained. First, the mechanical contact mechanism 12 will be explained. FIGS. 6 and 7 are schematic cross-sectional diagrams illustrating an example of the operation of the mechanical contact mechanism 12 provided by the push button switch 1 described in this application. FIG. 6 illustrates a state where the push button 10 of the push button switch 1 is not pushed, and FIG. 7 illustrates a state where the push button 10 is pushed. As illustrated in FIG. 6, in a case where the push button 10 is not pushed, the movable contact 120 attached to the rear (below in FIGS. 6 and 7) of the push button 10 is separated from the fixed contact 121, and the circuit is opened. As illustrated in FIG. 7, when an operator pushes down on the push button 10, the movable contact 120 that moves together with the push button 10 moves backward and contacts the fixed contact 121, closing the circuit. The mechanical contact mechanism 12 outputs an ON signal to the control circuit of the elevator body in a case where the circuit is closed. When the operator releases the push, the biasing member 122 biases the push button 10 forward, and the movable contact 120 separates from the fixed contact 121 by moving together with the forward movement of the push button 10, resulting in an open circuit state.

Figure 8:
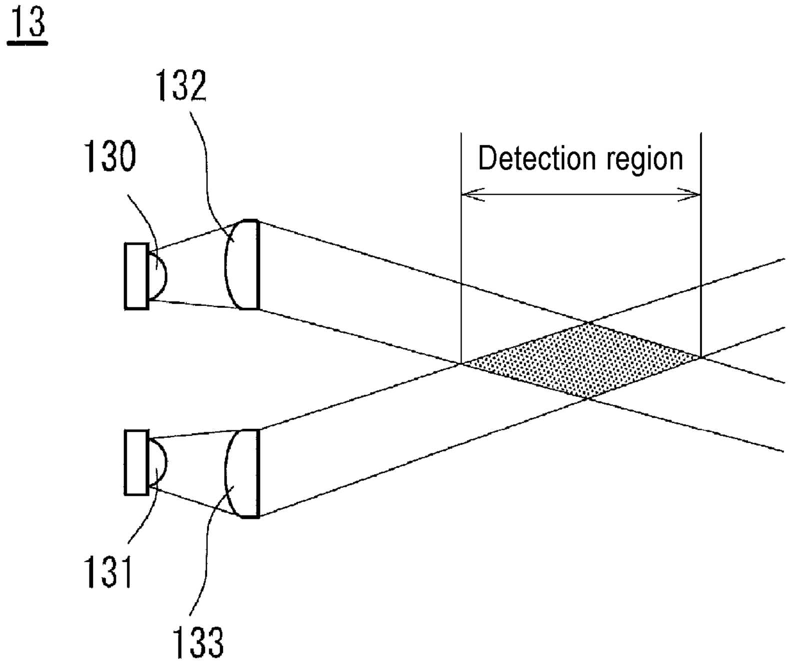
FIG. 8 is a schematic diagram schematically illustrating an example of an optical path related to a non-contact contact mechanism provided in the push button switch described in this application.
Figure 9:
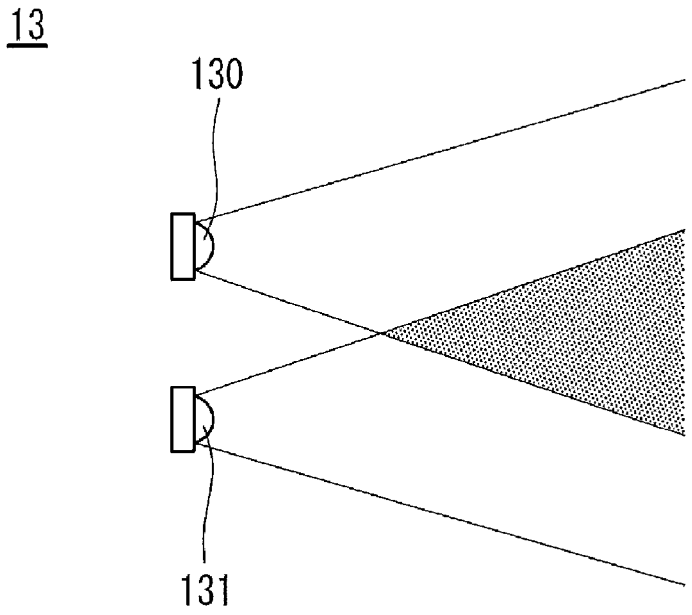
FIG. 9 is a schematic diagram schematically illustrating an example of an optical path related to a non-contact contact mechanism provided in the push button switch described in this application.

FIGS. 8 and 9 are schematic diagrams schematically illustrating an example of an optical path related to a non-contact contact mechanism 13 provided by the push button switch 1 described in this application. FIG. 8 exemplifies a form of the non-contact contact mechanism 13 provided by the push button switch 1 related to the embodiment explained using FIG. 4 and others. FIG. 9 illustrates another embodiment that does not include the light emitting lens 132 and the light receiving lens 133, illustrated for comparison. As illustrated in FIG. 8, the light emitting lens 132 provided by the non-contact contact mechanism 13 refracts the light emitted by the light emitting element 130, limiting the irradiation range of light. Moreover, the light receiving lens 133 limits the range of light received by the light receiving element 131. In FIGS. 8 and 9, the irradiation range of the light emitted by the light emitting element 130 and the light receiving range of the light received by the light receiving element 131 are illustrated in solid lines, and the region where the irradiation range and the light receiving range overlap is dotted as a detection region. The detection region is set in a front space opposite to the pushing direction of the push button 10.

When an object such as a human fingertip exists in the detection region where the irradiation range and light receiving range overlap, the light receiving element 131 may detect reflected light from the light emitted by the light emitting element 130. The push button switch 1 of the embodiment exemplified in FIG. 8 limits the detection region of the object compared to other embodiments exemplified in FIG. 9 by limiting the irradiation range and the light receiving range with the light emitting lens 132 and the light receiving lens 133. In detail, the push button switch 1 of the embodiment illustrated in FIG. 8 has the front vicinity of the push button 10 out of the detection region, and is out of the detection region when separated from the push button 10 by a predetermined distance or more. Furthermore, compared to the other embodiment exemplified in FIG. 9, the detection region in the direction orthogonal to the front direction is narrower. By having the front vicinity including the surface of the push button 10 out of the detection region, it is possible to prevent false detections in the operations by people such as visually impaired individuals who recognize position of the push button 10 by touch. By being out of the detection region when separated from the push button 10 by a predetermined distance or more, it is also possible to prevent false detections caused by reacting to objects that are not approaching. By narrowing the detection region in the up, down, left, and right directions, it is possible to prevent false detections cause by, for example, responding to fingertips approaching other push buttons 10.

Figure 10:
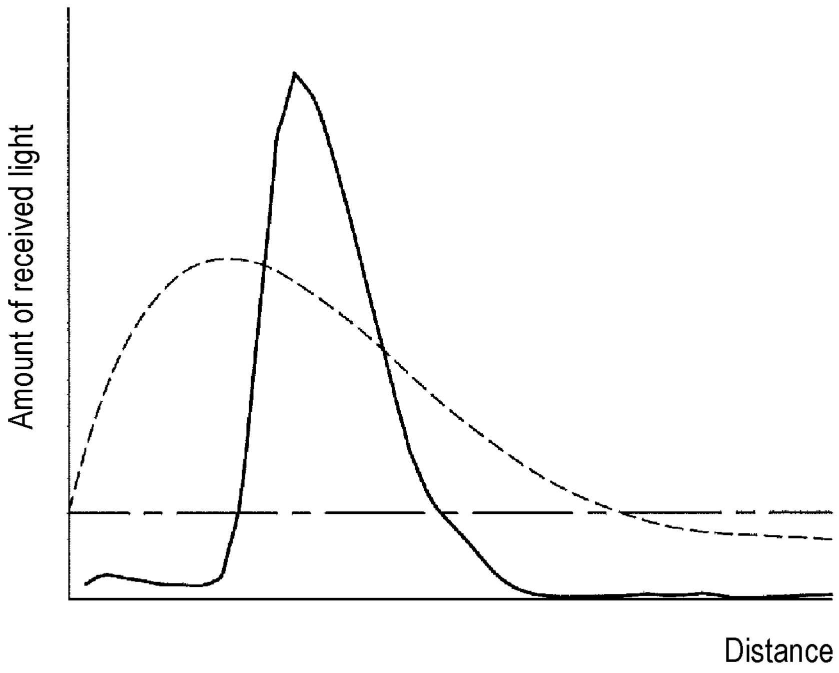
FIG. 10 is a graph illustrating an example of the relationship between the distance from the surface of the push button and the amount of received light in relation to the non-contact contact mechanism equipped with the push button switch described in this application.

FIG. 10 is a graph illustrating an example of the relationship between the distance from the surface of the push button 10 related to a non-contact contact mechanism 13 provided by the push button switch 1 described in this application and the amount of received light. In FIG. 10, the solid line illustrates a graph related to an embodiment equipped with the light emitting lens 132 and the light receiving lens 133 exemplified in FIG. 8 and others, and the dashed line illustrates a graph related to another embodiment without the light emitting lens 132 and the light receiving lens 133 exemplified in FIG. 9 for comparison. In FIG. 10, the horizontal axis represents the distance from the surface of the push button 10, and the vertical axis represents the amount of received light detected by the light receiving element 131 as reflected light, illustrating their relationship. The amount of received light gradually increases as it moves away from the surface of the push button 10, peaks at a predetermined distance, and then gradually decreases. As illustrated by a dotted chain line in FIG. 10, by setting an appropriate threshold, the range of distances where the amount of received light exceeds the threshold is set as the detection region in implementation. By providing the light emitting lens 132 and the light receiving lens 133, the peak of the amount of received light becomes narrower and higher, making it possible to improve detection accuracy and sensitivity.

Furthermore, while the push button switch 1 described in this application achieves various effects such as limiting detection regions by adopting a configuration equipped with the light emitting lens 132 and the light receiving lens 133 using a convex lens, it is also possible to adopt a configuration without a convex lens.

Figure 11:
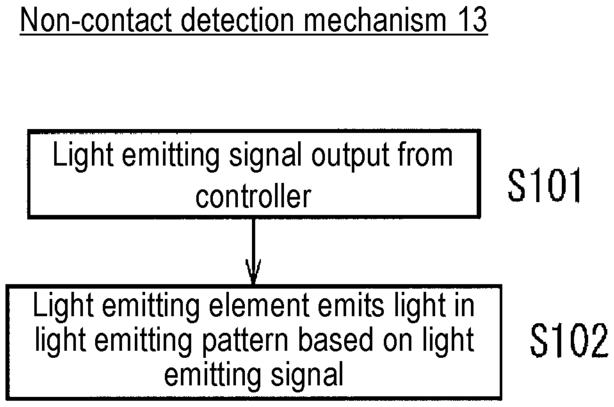
FIG. 11 is a flowchart illustrating an example of a light emitting process of the non-contact contact mechanism equipped with the push button switch described in this application.

Next, the control of the non-contact contact mechanism 13 provided by the push button switch 1 described in this application will be explained. FIG. 11 is a flowchart illustrating an example of light emitting processing of the non-contact contact mechanism 13 provided by the push button switch 1 described in this application. The non-contact contact mechanism 13 is triggered by activation conditions such as power activation or input of activation signals from the control circuit of the elevator body, and starts light emitting process. The non-contact contact mechanism 13 outputs a light emitting signal based on a predetermined light emitting pattern set in advance from the controller 135 to the light emitting element 130 (S101), and the light emitting element 130 emits light in the light emitting pattern based on the input light emitting signal (S102). The output of the light emitting signal based on the light emitting pattern from the controller 135 is, for example, the output of a pulse pattern that may be set as appropriate, such as repeating light emission for a predetermined time at predetermined intervals for predetermined number of times. The light emission of the light emitting element 130 is repeatedly performed according to the light emitting signal in a predetermined light emitting pattern set in advance.

Figure 12:
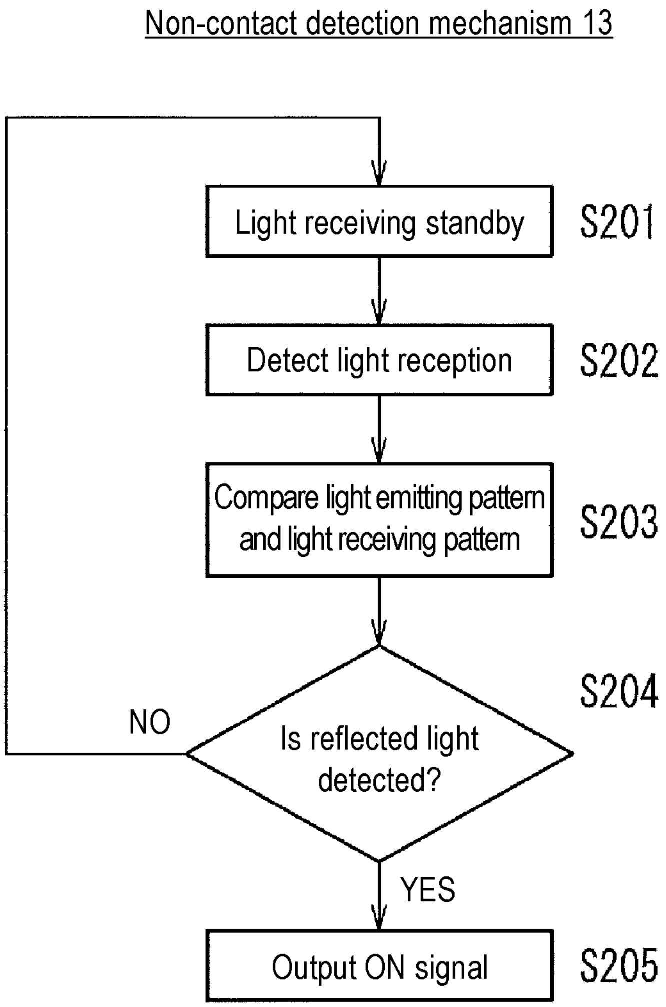
FIG. 12 is a flowchart illustrating an example of a light receiving process of the non-contact contact mechanism equipped with the push button switch described in this application.

FIG. 12 is a flowchart illustrating an example of light receiving processing of the non-contact contact mechanism 13 provided by the push button switch 1 described in this application. The non-contact contact mechanism 13 is triggered by activation conditions such as power activation or input of activation signals from the control circuit of the elevator body, and starts light receiving processing. The controller 135 sets the light receiving element 131 to a light receiving standby state (S201). When the light receiving element 131 detects light reception (S202), the controller 135 compares the light receiving pattern detected by the light receiving element 131 with a predetermined light emitting pattern set in advance to emit from the light emitting element 130 (S203). By comparing the light emitting pattern and the light receiving pattern at step S203, it is determined whether the detected light is reflected light emitted from the light emitting element 130. In particular, by setting different light emitting patterns for each push button switch 1, it is possible to prevent false detection of reflected light emitted from other push button switches 1.

Based on the comparison at step S203, the controller 135 determines whether or not the detection of light by the light receiving element 131 is a detection of reflected light emitted from the light emitting element 130 (S204). As a result of the comparison at step S203, in a case where the light emitting pattern and the light receiving pattern match, it is determined at step S204 that reflected light has been detected, and in a case where they do not match, it is determined that the detected light is not the reflected light. At step S204, in a case where it is determined that the reflected light has been detected (S204: YES), the controller 135 outputs an ON signal (S205). At step S205, the non-contact contact mechanism 13 outputs an ON signal to the control circuit of the elevator body by the controller 135. After finishing outputting the ON signal at step S205, the non-contact contact mechanism 13 returns to a light receiving standby state.

At step S204, in a case where it is determined that the light emitting pattern and the light receiving pattern do not match (S204: NO), the process returns to the light receiving standby state at step S201.

In this way, in a case where the controller 135 controls the non-contact contact mechanism 13 of the push button switch 1 and the non-contact contact mechanism 13 determines that the light receiving element 131 has detected the reflected light of the light emitted from the light emitting element 130, the non-contact contact mechanism 13 outputs an ON signal to the control circuit of the elevator body.

Modification Example

The push button switch 1 described in this application may be realized as an embodiment appropriately modified according to various conditions such as specifications, standards, and uses. A number of examples of numerous modification examples of the push button switch 1 described in this application will be explained.

Figure 13:
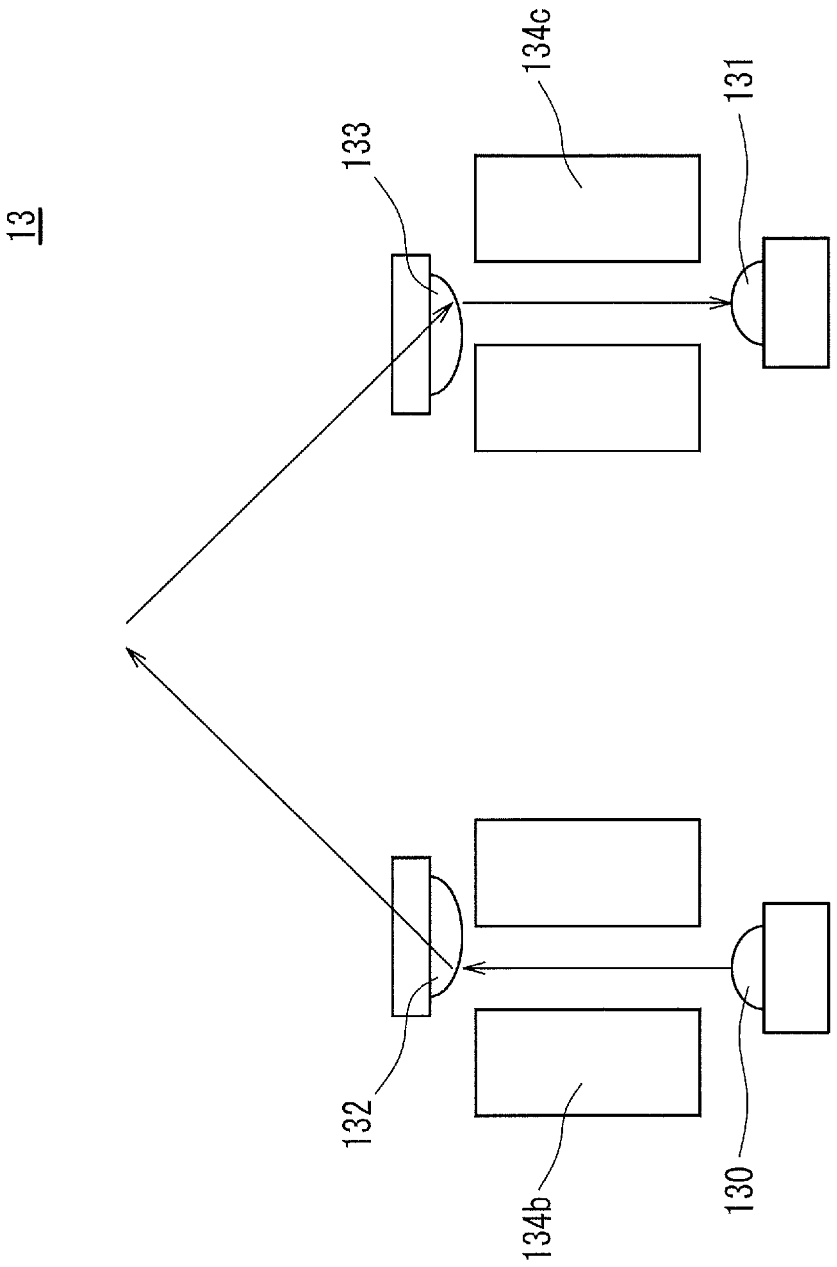
FIG. 13 is a schematic cross-sectional diagram illustrating an example of the non-contact contact mechanism equipped with the push button switch described in this application.
Figure 14:
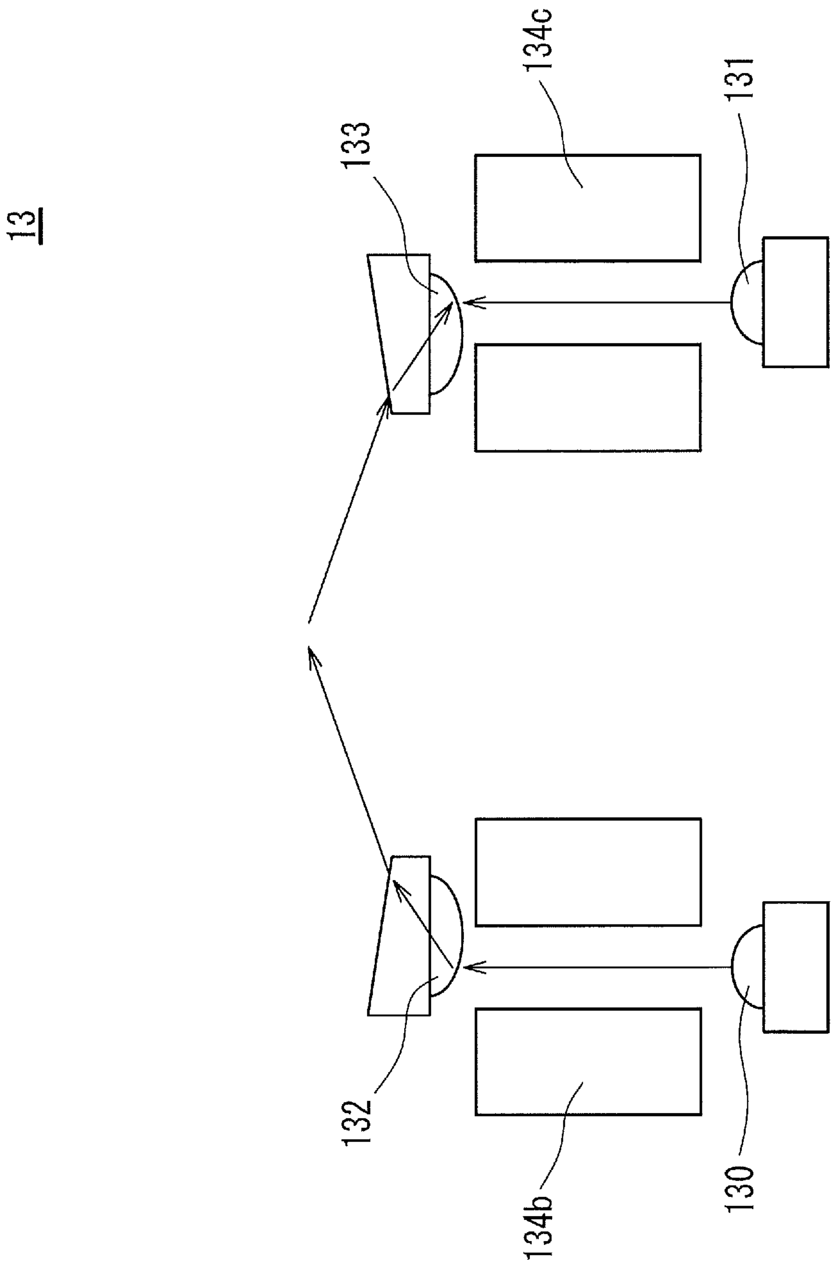
FIG. 14 is a schematic cross-sectional diagram illustrating an example of the non-contact contact mechanism equipped with the push button switch described in this application.

FIGS. 13 and 14 are schematic cross-sectional diagrams illustrating an example of a non-contact contact mechanism 13 provided by the push button switch 1 described in this application. FIGS. 13 and 14 schematically illustrate the light emitting element 130 and the light receiving element 131, a light emitting optical path 134*b*, a light receiving optical path 134*c*, the light emitting lens 132, and the light receiving lens 133, and light emitted from the light emitting element 130 and detected by the light receiving element 131. In FIGS. 13 and 14, a form in which a convex lens is used as the light emitting lens 132 and the light receiving lens 133 is exemplified. In the form exemplified in FIG. 13, the light emitting lens 132 is a convex lens with a refractive surface formed to refract light only on the entering side which is the light emitting optical path 134*b* side. Moreover, the light receiving lens 133 is a convex lens with a refractive surface formed only on the exiting side that is the light receiving optical path 134*c* side. In the form exemplified in FIG. 14, the light emitting lens 132 is a convex lens formed with a refractive surface formed to refract light on both sides of the entering side that is the light emitting optical path 134*b* side and the exiting side which is the external side. Moreover, the light receiving lens 133 is a convex lens with refractive surfaces formed on both sides of the entering side that is the external side and the exiting side that is the light receiving optical path 134*c* side. As clearly seen in comparison between FIGS. 13 and 14, depending on the form of the light emitting lens 132 and the light receiving lens 133, the optical paths of the light differ, which also changes the detection region set thereby. Compared to the form illustrated in FIG. 13, in the form illustrated in FIG. 14, it is possible to set a detection region at a position close to the push button 10. For example, in a case where the outer shape of the push button 10 is large and the arrangement interval of the light emitting lens 132 and the light receiving lens 133 becomes long, that detection region is set at a position far from the push button 10. In a case where it is preferable in practice to bring the set detection region closer to the push button 10, as illustrated in FIG. 14, by using a convex lens with refractive surfaces formed on both sides, it is possible to bring the setting range of the detection region closer to the push button 10. In particular, as illustrated in FIG. 14, since the light emitting lens 132 and the light receiving lens 133 are formed as slopes on the outer side, it is possible to establish an optimal detection region by appropriately setting the angle of the slope.

Figure 15:
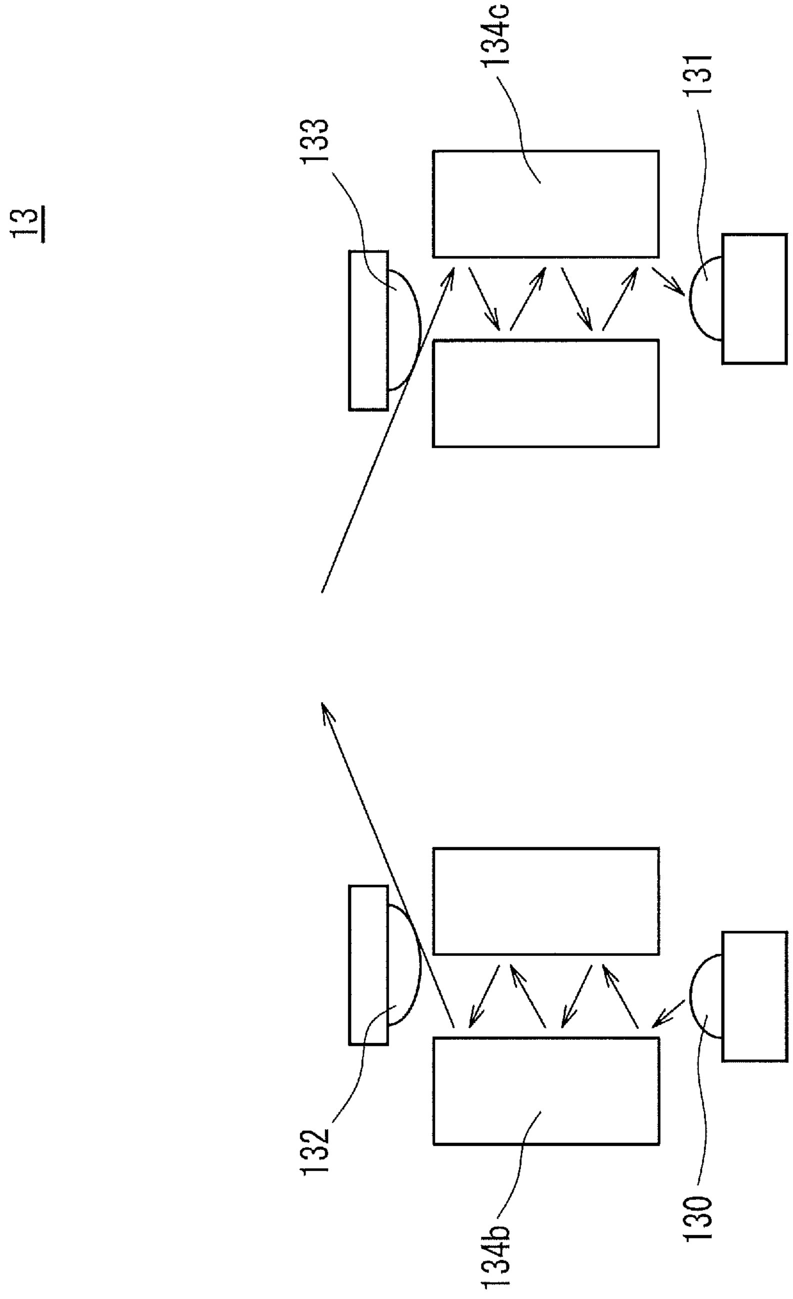
FIG. 15 is a schematic cross-sectional diagram illustrating an example of the non-contact contact mechanism equipped with the push button switch described in this application.

FIG. 15 is a schematic cross-sectional diagram schematically illustrating an example of the non-contact contact mechanism 13 provided by the push button switch 1 described in this application. FIG. 15 schematically illustrates the light emitting element 130, the light receiving element 131, the light emitting optical path 134*b*, the light receiving optical path 134*c*, the light emitting lens 132, the light receiving lens 133, and light emitted from the light emitting element 130 and detected by the light receiving element 131. In the embodiment illustrated in FIG. 15, on the light emitting side, among the light emitted from the light emitting element 130, the light that exiting at an angle from the front direction reflects repeatedly in the light emitting optical path 134*b*, and exits to the outside without passing through the light emitting lens 132. Moreover, on the light receiving side, and the light entered from the outside without passing through the light receiving lens 133 reflects repeatedly in the light receiving optical path 134*c* and is detected by the light receiving element 131. If the amount of light exiting without passing through the light emitting lens 132 and entered without passing through the light receiving lens 133 is large, the setting accuracy of the detection region decreases. Thus, by adjusting design elements such as the size and arrangement position of the light emitting lens 132 and the light emitting optical path 134*b* as well as the light receiving lens 133 and the light receiving optical path 134*c*, it is possible to suppress the occurrence of situations illustrated in FIG. 15 and increase the setting accuracy of the detection region.

Figure 16:
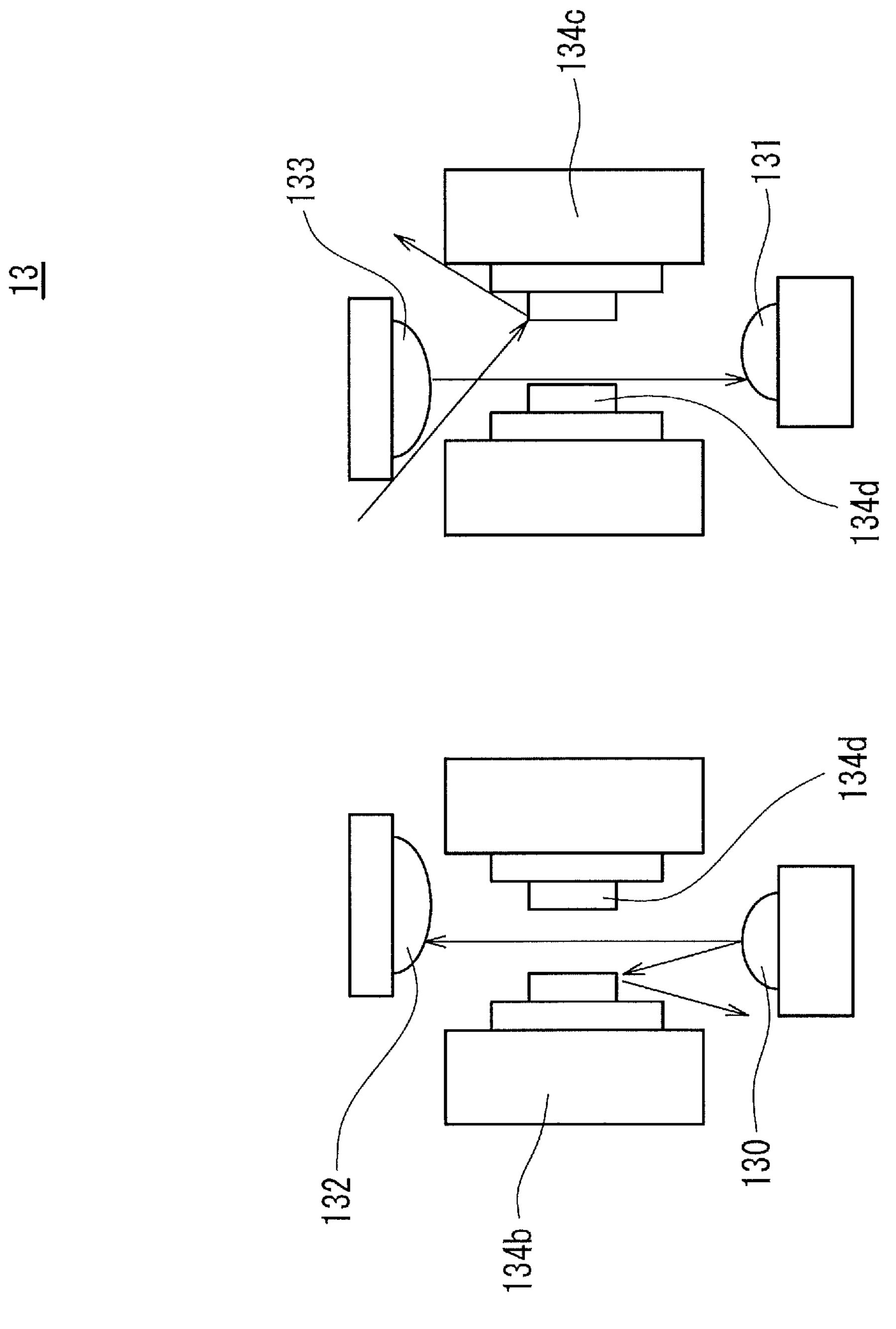
FIG. 16 is a schematic cross-sectional diagram illustrating an example of the non-contact contact mechanism equipped with the push button switch described in this application.

FIG. 16 is a schematic cross-sectional diagram illustrating an example of the non-contact contact mechanism 13 provided by the push button switch 1 described in this application. FIG. 16 schematically illustrates the light emitting element 130, the light receiving element 131, the light emitting optical path 134*b*, the light receiving optical path 134*c*, the light emitting lens 132, the light receiving lens 133, and light emitted from the light emitting element 130 and detected by the light receiving element 131. FIG. 16 illustrates a modified example in a case where it is unavoidable to generate light that does not pass through the light emitting lens 132 and the light receiving lens 133 in the design of the push button switch 1. The push button switch 1 illustrated in FIG. 16 has a step-like protruding part 134*d* protruding inward near the center of the inner wall of the tubular light emitting optical path 134*b*. Among the light emitted from the light emitting element 130, the light exiting toward the front direction passes through the light emitting lens 132 and exits to the outside, and the light exiting at an angle from the front direction is blocked by the protruding part 134*d*. The push button switch 1 illustrated in FIG. 16 may block light existing in a direction to the outside without passing through the light emitting lens 132 by the protruding part 134*d* of the light emitting optical path 134*b*. Furthermore, the push button switch 1 illustrated in FIG. 16 has a step-like protruding part 134*d* protruding inward near the center of the inner wall of the tubular light receiving optical path 134*c*. The light entered into the light receiving optical path 134*c* without passing through the light receiving lens 133 is blocked by the protruding part 134*d*. Thus, the push button switch 1 illustrated in FIG. 16 can improve the setting accuracy of the detection region.

Figure 17:
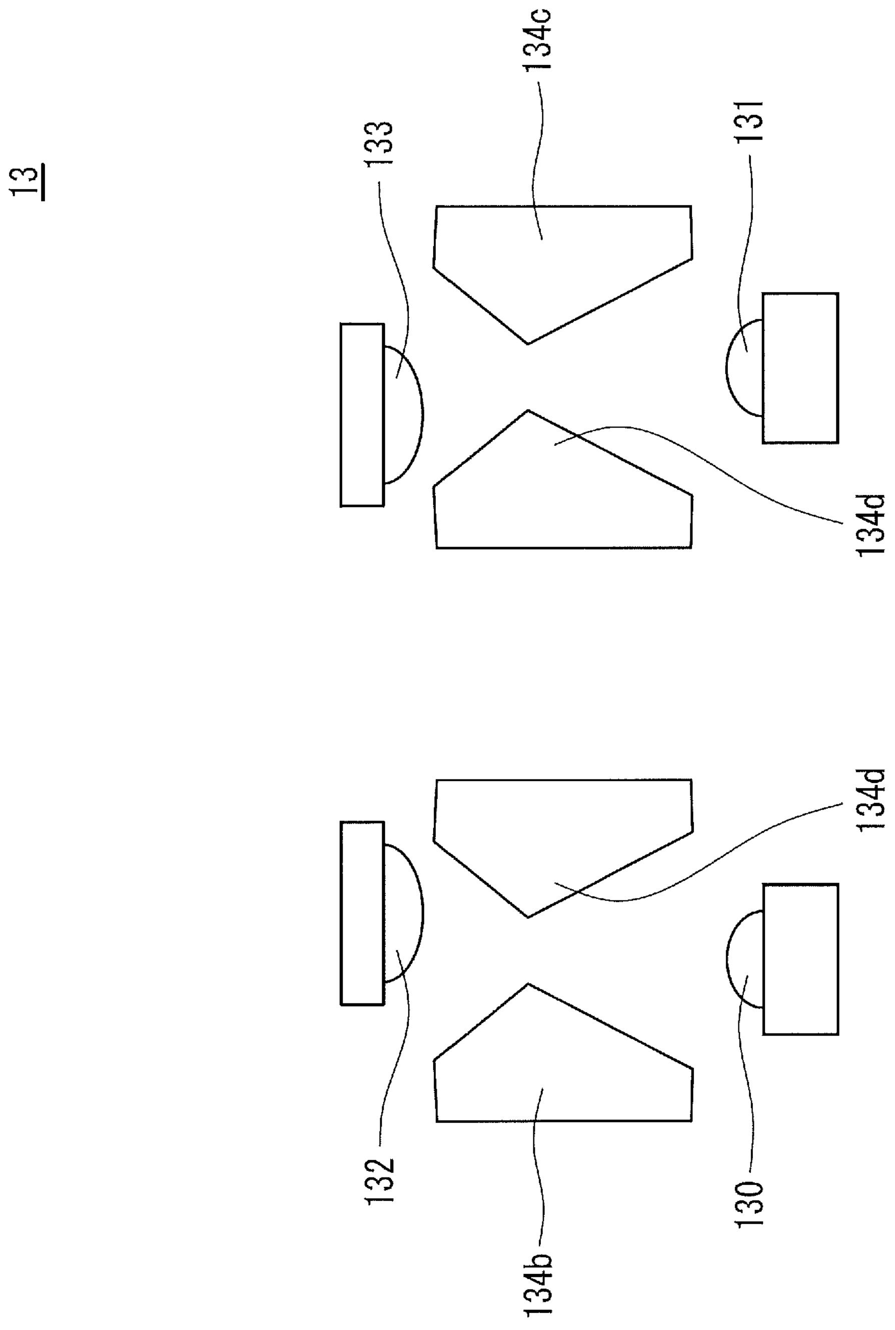
FIG. 17 is a schematic cross-sectional diagram illustrating an example of the non-contact contact mechanism equipped with the push button switch described in this application.

FIG. 17 is a schematic cross-sectional diagram illustrating an example of the non-contact contact mechanism 13 provided by the push button switch 1 described in this application. FIG. 17 schematically illustrates the light emitting element 130, the light receiving element 131, the light emitting optical path 134*b*, the light receiving optical path 134*c*, the light emitting lens 132, the light receiving lens 133, and the light emitted from the light emitting element 130 and detected by the light receiving element 131. FIG. 17 illustrates another embodiment of the protruding part 134*d* illustrated in FIG. 16. The protruding part 134*d* illustrated in FIG. 17 is formed as an inclined surface in relation to the front direction. The protruding part 134*d* formed as an inclined surface in FIG. 17 achieves the same effect as the protruding part 134*d* illustrated in FIG. 16.

Figure 18:
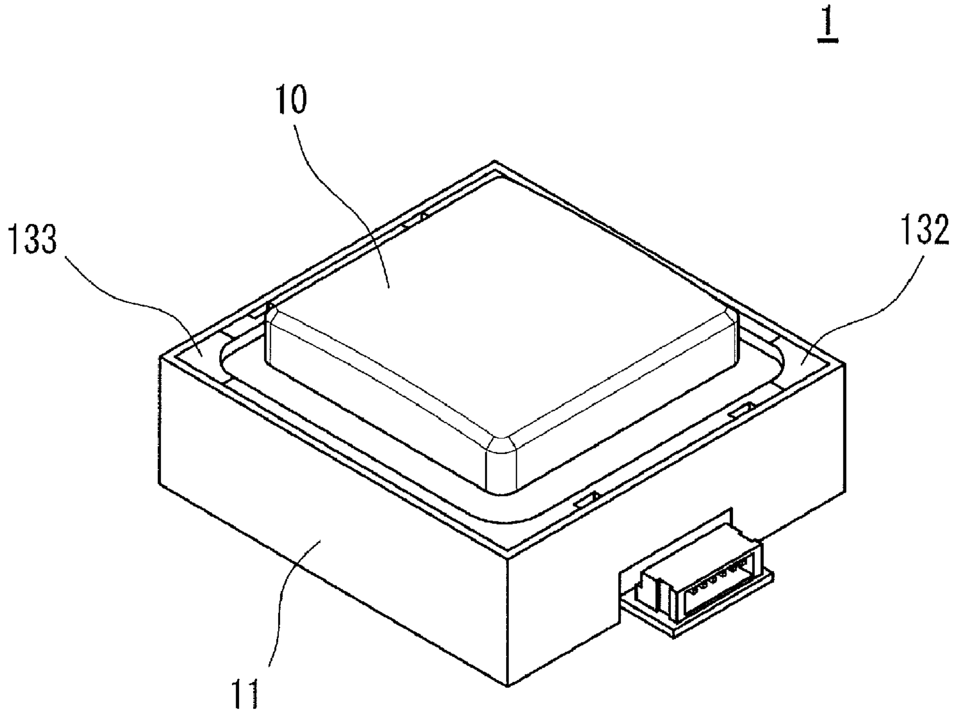
FIG. 18 is a schematic perspective diagram illustrating an example of the appearance of the push button switch described in this application.

FIG. 18 is a schematic perspective diagram illustrating an example of the appearance of the push button switch 1 described in this application. FIG. 18 is another embodiment in which the outer shape of the push button switch 1 has been modified. Moreover, in FIG. 18, the notation part 100, which imitates the shape of opening symbols and the like, is omitted. The push button switch 1 exemplified in FIG. 18 has the housing 11 formed in a substantially rectangular parallelepiped shape, and the shape of the push button 10 disposed on the front surface of the housing 11 is formed in a substantially square shape from a line of sight viewed from the front in the pushing direction. The vicinity of the upper right vertex of the front surface of the housing 11 is a light emitting position where the light emitting lens 132 is disposed, and vicinity of the lower left vertex is a light receiving position where the light receiving lens 133 is disposed. Even in the embodiment exemplified in FIG. 18, since the light emitting lens 132 and the light receiving lens 133 are disposed outward the edge of the push button 10, it is possible to prevent finger tips from touching during push operation on the push button 10 by an operator, thereby suppressing adhesion of adhering substances such as grease on fingertips. Moreover, since the shape of the outer edge of the push button 10 is a substantially square shape with rotational symmetry, the midpoint of a line segment connecting the light emitting position and the light receiving position is formed to substantially coincide with the center symmetry of rotational symmetry. Thus, in the push button switch 1 described in this application, by making the midpoint of the line segment connecting the light emitting position and the light receiving position coincide with the center of symmetry of rotational symmetry which is the notation part 100, a fingertip approaching the notation part 100 can accurately detected. The same effect can be obtained even in a case where other rotationally symmetric shapes such as rectangles are used for shaping the outer edge shape of the push button 10. Moreover, various embodiments may be developed, such as designing the shape of the outer edge of the push button to be a line-symmetrical shape and designing the symmetry axis of the line symmetry to be positioned on the push button 10.

As described above, the push button switch 1 described in this application includes the mechanical contact mechanism 12 using the push button 10 that may be pushed in, and the non-contact contact mechanism 13 using the light emitting element 130 and the light receiving element 131. The light receiving element 131 detects light reflected by objects such as human fingertips emitted from the light emitting element 130. Thus, not only push operation of the push button 10 but also non-contact operation by detecting reflected light from object may be performed by the push button switch 1 described in this application, resulting in excellent effects. Detection by the non-contact contact mechanism 13 brings about various effects such as improvement in convenience, improvement in hygiene by avoiding direct contact, and further suppression of failures due to reduction in the number of machine operations.

Furthermore, the push button switch 1 described in this application limits the irradiation range of the light emitted by the light emitting element 130 and further limits the receiving range of light received by the light receiving element 131 through the arrangement and shape of the light emitting lens 132 and the light receiving lens 133. The push button switch 1 described in this application sets a detection region of an object by limiting the irradiation range and the light receiving range. Specifically, it is set to have the front vicinity of the push button 10 out of the detection region, and be out of the detection region when separated from the push button 10 by a predetermined distance or more. Furthermore, the detection region is narrower in the up, down, left, and right directions perpendicular to the front direction. By having the front vicinity including the surface of the push button 10 out of the detection region, it is possible to prevent false detections against operations by people such as visually impaired people who recognize the position of the push button 10 by touch. By being out of the detection region when separated from the push button 10 by a predetermined distance or more, it is possible to prevent false detections that respond to an object that is not approaching. The push button switch 1 described in this application can prevent false detections such as responding to fingers approaching other push buttons 10 by narrowing down the detection region in the up, down, left, and right directions, achieving excellent effects.

Furthermore, the push button switch 1 described in this application arranges the light emitting position and light receiving position outward the edge of the push button 10. As a result, in the push button switch 1 of the application, since fingertips do not touch during a push operation on the push button 10 by an operator, it is possible to suppress adhesion of adhering substances such as grease on fingertips, achieving excellent effects.

Furthermore, by designing such that a midpoint of a line segment connecting the light emitting position and light receiving position coincides with the center of symmetry of rotational symmetry which is the center of the notation part 100 in the push button switch 1 of the application, it is possible to accurately detect fingertips approaching the notation part 100, achieving excellent effects.

Furthermore, in the push button switch 1 of the application, by forming the protruding part 134*d* protruding inside the tubular light emitting optical path 134*b* and light receiving optical path 134*c*, it is possible to improve setting accuracy of the detection region, achieving excellent effects.

The disclosure is not limited to each embodiment described above but may be developed into various other forms. Thus, all embodiments mentioned above are merely illustrative in all respects and should not be interpreted restrictively. The technical scope of this disclosure is explained by scope of claims and is not bound at all by specification text. Furthermore, all modifications and changes belonging to equivalent scope of claims are within scope of this disclosure.

For example, in the aforementioned embodiment, a form applied as an elevator operation switch was shown, but the disclosure is not limited thereto, and may also be applied as a push button switch 1 other than the elevator operation switch, for example, an industrial robot operation switch and other various push button switches 1.

What is claimed is:

1. A push button switch comprising a push button that may be pushed in, a movable contact that moves together with the push button, and a fixed contact with respect to which the movable contact comes into contact or separates in accordance with an operation of the movable contact, the push button switch comprising:

a light emitting element that emits light; and a light receiving element that detects light, wherein a light emitting position at which light emitted from the light emitting element is radiated to an outside, and a light receiving position at which light detected by the light receiving element is received from the outside are disposed outward of an edge of the push button in a line of sight viewed in a pushing direction, and wherein the light receiving element is disposed is such a way as to detect light that has been emitted from the light emitting element and has been reflected by an object in a detection region set in a space on a side of the push button in an opposite direction to the pushing direction.

2. The push button switch according to claim 1, wherein from a viewpoint of viewing the pushing direction, a midpoint of a line segment connecting the light emitting position and the light receiving position is positioned on the push button.

3. The push button switch according to claim 2, wherein from a viewpoint of viewing the pushing direction, a shape of an outer edge of the push button is rotationally symmetrical, and the midpoint of the line segment connecting the light emitting position and the light receiving position substantially coincides with a center of symmetry of rotational symmetry.

4. The push button switch according to claim 3, further comprising:

a light emitting optical path through which light emitted from the light emitting element passes;

a light emitting lens disposed at the light emitting position and refracting light passing through the light emitting optical path;

a light receiving optical path through which light detected by the light receiving element passes; and a light receiving lens disposed at the light receiving position and refracting light from outside to pass through the light receiving optical path.

5. The push button switch according to claim 3, further comprising:

a device for causing the light emitting element to emit light in a predetermined light emitting pattern;

a device for comparing a light receiving pattern detected by the light receiving element with the light emitting pattern; and a device for determining, in a case where the light receiving pattern matches the light emitting pattern, that reflected light of light emitted from the light emitting element has been detected.

6. The push button switch according to claim 2, further comprising:

a light emitting optical path through which light emitted from the light emitting element passes;

a light emitting lens disposed at the light emitting position and refracting light passing through the light emitting optical path;

a light receiving optical path through which light detected by the light receiving element passes; and a light receiving lens disposed at the light receiving position and refracting light from outside to pass through the light receiving optical path.

7. The push button switch according to claim 2, further comprising:

a device for causing the light emitting element to emit light in a predetermined light emitting pattern;

a device for comparing a light receiving pattern detected by the light receiving element with the light emitting pattern; and a device for determining, in a case where the light receiving pattern matches the light emitting pattern, that reflected light of light emitted from the light emitting element has been detected.

8. The push button switch according to claim 1, further comprising:

a light emitting optical path through which light emitted from the light emitting element passes;

a light emitting lens disposed at the light emitting position and refracting light passing through the light emitting optical path;

a light receiving optical path through which light detected by the light receiving element passes; and a light receiving lens disposed at the light receiving position and refracting light from outside to pass through the light receiving optical path.

9. The push button switch according to claim 8, wherein at least one of the light emitting lens and the light receiving lens has a refractive surface formed on either an exiting side or an entering side for refracting light.

10. The push button switch according to claim 9, wherein at least one of the light emitting optical path and the light receiving optical path has a tubular shape with a protruding part protruding inward.

11. The push button switch according to claim 9, further comprising:

a device for causing the light emitting element to emit light in a predetermined light emitting pattern;

a device for comparing a light receiving pattern detected by the light receiving element with the light emitting pattern; and a device for determining, in a case where the light receiving pattern matches the light emitting pattern, that reflected light of light emitted from the light emitting element has been detected.

12. The push button switch according to claim 8, wherein at least one of the light emitting lens and the light receiving lens has a refractive surface formed on both the exiting side and the entering side for refracting light.

13. The push button switch according to claim 12, wherein at least one of the light emitting optical path and the light receiving optical path has a tubular shape with a protruding part protruding inward.

14. The push button switch according to claim 12, further comprising:

a device for causing the light emitting element to emit light in a predetermined light emitting pattern;

a device for comparing a light receiving pattern detected by the light receiving element with the light emitting pattern; and a device for determining, in a case where the light receiving pattern matches the light emitting pattern, that reflected light of light emitted from the light emitting element has been detected.

15. The push button switch according to claim 8, wherein at least one of the light emitting optical path and the light receiving optical path has a tubular shape with a protruding part protruding inward.

16. The push button switch according to claim 15, further comprising:

a device for causing the light emitting element to emit light in a predetermined light emitting pattern;

a device for comparing a light receiving pattern detected by the light receiving element with the light emitting pattern; and a device for determining, in a case where the light receiving pattern matches the light emitting pattern, that reflected light of light emitted from the light emitting element has been detected.

17. The push button switch according to claim 8, further comprising:

a device for causing the light emitting element to emit light in a predetermined light emitting pattern;

a device for comparing a light receiving pattern detected by the light receiving element with the light emitting pattern; and a device for determining, in a case where the light receiving pattern matches the light emitting pattern, that reflected light of light emitted from the light emitting element has been detected.

18. The push button switch according to claim 1, further comprising:

a device for causing the light emitting element to emit light in a predetermined light emitting pattern;

a device for comparing a light receiving pattern detected by the light receiving element with the light emitting pattern; and a device for determining, in a case where the light receiving pattern matches the light emitting pattern, that reflected light of light emitted from the light emitting element has been detected.

* * * * *